(12) United States Patent
Wei (10) Patent No.: US 7,944,852 B2
(45) Date of Patent: *May 17, 2011

(54) INTELLIGENT PRESENTATION NETWORK MANAGEMENT SYSTEM (75) Inventor: Xinguo Wei, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,945

(22) Filed: Dec. 15, 2009

(65) Prior Publication Data

US 2010/0174755 A1    Jul. 8, 2010

Related U.S. Application Data (63) Continuation of application No. 09/511,168, filed on Feb. 24, 2000, now Pat. No. 7,693,042.

(60) Provisional application No. 60/140,549, filed on Jun. 23, 1999.

(51) Int. Cl.
*H04W 84/00* (2009.01)

(52) U.S. Cl. ........ 370/252; 370/259; 370/310; 707/802; 715/853

(58) Field of Classification Search .................. None
See application file for complete search history.

(56) References Cited

U.S. PATENT DOCUMENTS

| | | | | |
|---|---|---|---|---|
| 6,018,567 A | * | 1/2000 | Dulman | 379/32.03 |
| 6,788,315 B1 | * | 9/2004 | Kekic et al. | 715/733 |
| 7,142,820 B1 | * | 11/2006 | Rajala | 455/67.7 |
| 7,693,042 B1 | * | 4/2010 | Wei | 370/216 |

* cited by examiner

*Primary Examiner* — Chi H. Pham
*Assistant Examiner* — Shick Hom
(74) *Attorney, Agent, or Firm* — Moazzam & Associates, LLC (57) ABSTRACT A system and method has been provided for the intuitive management of communication networks including a large number of network elements diffused across large geographical areas. The network management system permits the system operator to identify system problems while monitoring the top-level map of the communications network. The organization of network displays permits an operator to "zoom" from the higher levels of network abstraction, depicting a large number of elements across a large geographic area, to local geographical areas where specific problems associated with individual elements can be identified.

20 Claims, 10 Drawing Sheets

INTELLIGENT PRESENTATION NETWORK MANAGEMENT SYSTEM

RELATED APPLICATION

This application is a continuation of U.S. patent application Ser. No. 09/511,168, filed Feb. 24, 2000, now U.S. Pat. No. 7,693,042, which claims priority to U.S. Provisional Patent Application Ser. No. 60/140,549, filed Jun. 23, 1999, the contents of both of which are incorporated by reference herein in their entirety

BACKGROUND OF THE INVENTION

The invention relates generally to network management systems and, more particularly, to an intuitive system and method of managing and diagnosing problems in a large wireless communications network.

Modern communication networks are composed of millions of functional elements, geographically dispersed across thousands of miles of service territory. To properly manage a network, provide for redundant call routing, and respond to local emergencies, a global, top-level view of the system is required. It is well known for a communications network to tightly monitor the individual phones, switch elements, relays, base station, and the like. Monitoring the communication network elements yields information concerning the health, maintenance, current activity, performance, and security of these elements. Such information is collected at the local levels in the network. Before such information can be passed on to the higher levels of management, it must first be summarized, as it would be impossible for a top-level systems administrator to handle such information in its raw form from thousands of network elements.

Additionally, the monitoring and diagnostic functions of communication network elements can be organized along specialized areas of focus, or network management tasks. For optimum performance, the information should efficiently summarize activity occurring at local levels in the network for use by administrators who manage the communications network from a regional or national perspective. It can be difficult to coordinate all the areas of narrowed focus into a comprehensive picture of network problems at the higher levels. The administrator has the difficult task of analyzing problems occurring to network elements (NE)s through whatever filtering or processing functions the network imposes between the administrator and the NEs.

The International Telecommunications Union-Telecommunications Standardization Sector (ITU-T) Telecommunications Management Network (TMN) suggests a five-layer management structure. At the lowest level is the Network Element Layer (NEL) including switches and transmission distribution equipment. Above the NEL is the Element Management layer (EML), which manages the lower-level elements, dealing with issues such as capacity and congestion. The Network Management Level (NML) is concerned with managing the communication network systems associated with the NEL and EML. The Service Management Layer (SML) manages the services that are offered to the customers of the network, while the Business Management Layer (BML) on top manages the business and sets goals with respect to the customer and government agencies.

Networks are typically composed of NEs from a large variety of different vendors. Therefore, there are a variety of Element Management Systems (EMS) to support communications with the NE types. The Network Management System (NMS) must interface with divergent EMS level equipment and protocols. It is the NMS system that is responsible for controlling the communications network and keeping it functioning on a day-to-day basis.

The ITU-T also divides management into five Operations Support Systems (OSS) areas of interest. They are Fault Management, Configurations Management, Account Management, Performance Management, and Security Management—collectively referred to as FCAPS. As is well understood in the art, Fault Management is concerned with detecting equipment problems, responding to detected problems, fixing the problems, and putting the network back into working order. Configuration Management is concerned with databases, backup systems, and provisioning and enablement of new network resources. Account Management bills customers for service. Performance Management is concerned with collecting and analyzing data that measures how well the system is working. Security Management controls and enables NE functions. Portions of each FCAPS function are performed at every layer of the TMN architecture.

The Fault Management System is one of the most critical systems in the network to control. Intelligent NEs, able to perform self-diagnosis, may provide a precise error message to the NMS. However, many NEs merely send an alarm when a problem occurs, such as switch failures, loss of power, line failure, and loss of RF coverage (for wireless systems). The NMS system collects the alarm data for analysis—for example, analysis of a common failure mode among NEs in close physical proximity. The NMS could then issue a repair directive in response to the analysis. Intruder detection and interlock switch detection are examples of some security management issues that could be reported to the NMS by NEs.

A number of problems can occur in the processing and analysis of network element status at management levels in the communications network. Some of the problems result from the summarization process that must occur if a large number of network elements are to be managed from a central node. Other problems result from the dispersal of network elements across large distances. Still other problems result in attempting to supervise across different network management functions. All these problems stem from judgments that must be based on abstracted status reports. Even if it were possible for a supervisor to know each and every rule-set used to summarize the problems represented at different layers of network management, different geographical areas, and different network issues, every abstraction necessarily filters out input data that could be of use in the analysis of a network problem.

It would be advantageous to have a method of representing network elements and their problems in such a manner as to provide a convenient summary to network management systems.

It would be advantageous to have an intuitive method of representing NE fault alarms in a communications network so as to provide an administrator at the NMS a clear picture of the condition of NEs.

It would be advantageous to have a method for an administrator to track the status of individual NEs from a summary report at the NMS.

It would be advantageous to have a method for supervising a network to view both an abstraction of network problems, where a plurality of elements and issues are represented, and detailed presentations of individual elements, to determine specific problems and locations.

SUMMARY OF THE INVENTION

Accordingly, a method is provided for managing a plurality of network elements in a communications network. The method entails organizing the communications network into a hierarchy of geographical maps, where a map at a higher level in the hierarchy includes a plurality of maps from a lower level in the hierarchy; locating each network element from a plurality of network elements on a map in the lower level in the hierarchy; reporting the status of each network element; and summarizing the status of a plurality of network elements on the map at the higher level in the hierarchy.

The monitoring of conditions at lower levels in the hierarchy includes establishing alarm conditions for some forms of network element status—for example, when a network element ceases to function. The summarization of status includes representing the status of several network elements simultaneously in a way that is meaningful to a supervisor viewing the higher order map.

Advantageously, the network is managed in real-time, and the lower level reporting includes updating the status of network elements represented in a plurality of geographical areas at the lower level. The higher level summarization includes setting an alarm responsive to changes in the condition of network elements at the lower level. Typically, the network elements are summarized on the higher order map with a first icon. The alarm mechanism is the change of appearance of an icon in response to changes in the status of the element represented by the icon.

The higher level summaries of NEs (icons) involve the establishment of a set of rules defining the meaning of the icon—that is, the conditions under which the icon changes appearance. The rules can be changed for different situations or administration functions. In fact, the rule-sets may be varied in response to the identity of the system administrator, based on a predefined set of characteristics. The rule-set can be defined by conditions in the system such as power source status, software corruption, hardware failure, environmental factors, and intruder alerts.

A system is also provided for the presentation of NEs in a large communications network. The system comprises a plurality of network elements having fixed positions and a database including the geographical location of these network elements. A computer-hosted programmable application organizes the communication network into a hierarchical arrangement of geographical areas. The condition of the network elements geographically located at a lower level in the hierarchy is summarized at higher levels in the hierarchy.

A display presents a modifiable update report of network elements, while a supervisor interface connected to the application provides commands to modify the application and display. At the most basic level of operation, the base stations and remote unit elements in the network are represented as having an operational and non-operational status. The database is updated on the status of each base station and remote unit, and the application summarizes the status of the base stations and remote units at the higher hierarchical levels with an icon. In response to a change in the icon, the supervisor can scale down through the displayed hierarchy of maps to locate specific network elements and identify particular problems.

DETAILED DESCRIPTION OF THE PREFERRED EMBODIMENT

A Network Management System is presented herein which is applicable to the monitoring, supervision, and presentation of large communication systems, such as AT&T's Fixed Wireless Network. Due to the potentially large volumes of network elements (NE) installed nation-wide, an innovative system and method is required to help network operators effectively monitor the network. The present inventive approach applies a map-based display mechanism which permits the network operators to navigate through the network efficiently from top to bottom. The spatial partition of the network elements is important in understanding and organizing the management of the communications network.

Figure 1:
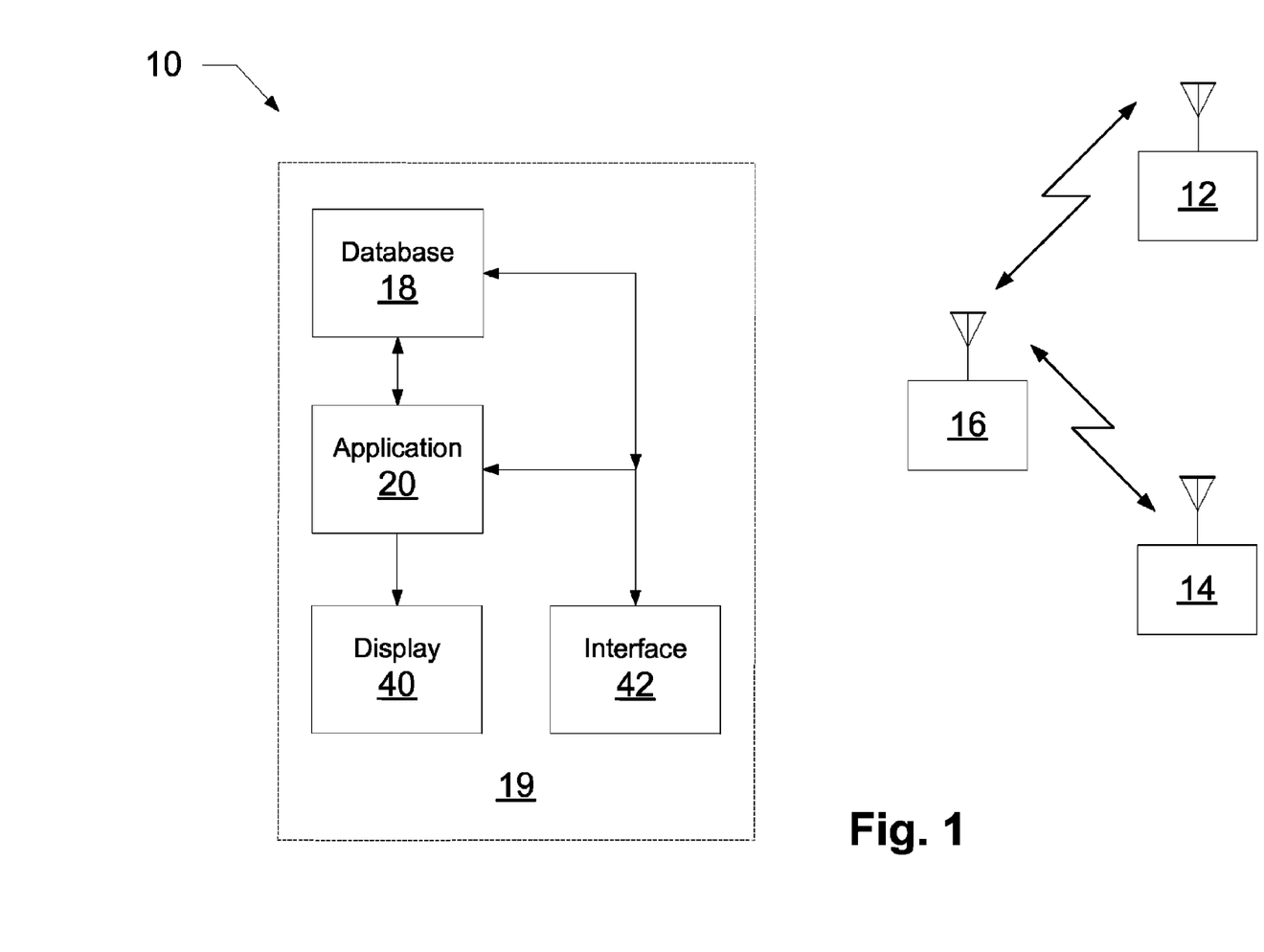
FIG. 1 is a block diagram schematic of the present inventive system for presenting and managing a communications network.

FIG. 1 is a block diagram schematic of the present inventive system for presenting and managing a communications network. A communications network 10 comprises a plurality of elements (NEs), represented by elements 12, 14, and 16. The elements are located at fixed-position sites and therefore have geographic locations. In some aspects of the invention, network 10 is a fixed wireless system (FWS), and the elements are base stations, such as base station 16, and remote units, such as remote units 12 and 14. An electronic database 18 includes the geographical location of the network elements 12, 14, and 16 and geographically locates these network elements.

A network management system 19 includes an application 20, hosted on a computer, and connected to the database 18 to organize the communications network into a hierarchical arrangement of geographic areas, where each network element is located at a lower level in the hierarchy of geographical areas. The application 20 summarizes the representation of a plurality of network elements, located in a lower level in the hierarchy of geographical areas, at a higher level in the hierarchy of geographical areas. The plurality of elements, typically many more than elements 12, 14, and 16, are difficult to see or work with on an individual basis when network 10 is viewed from higher orders in the geographical hierarchy.

Figure 2:
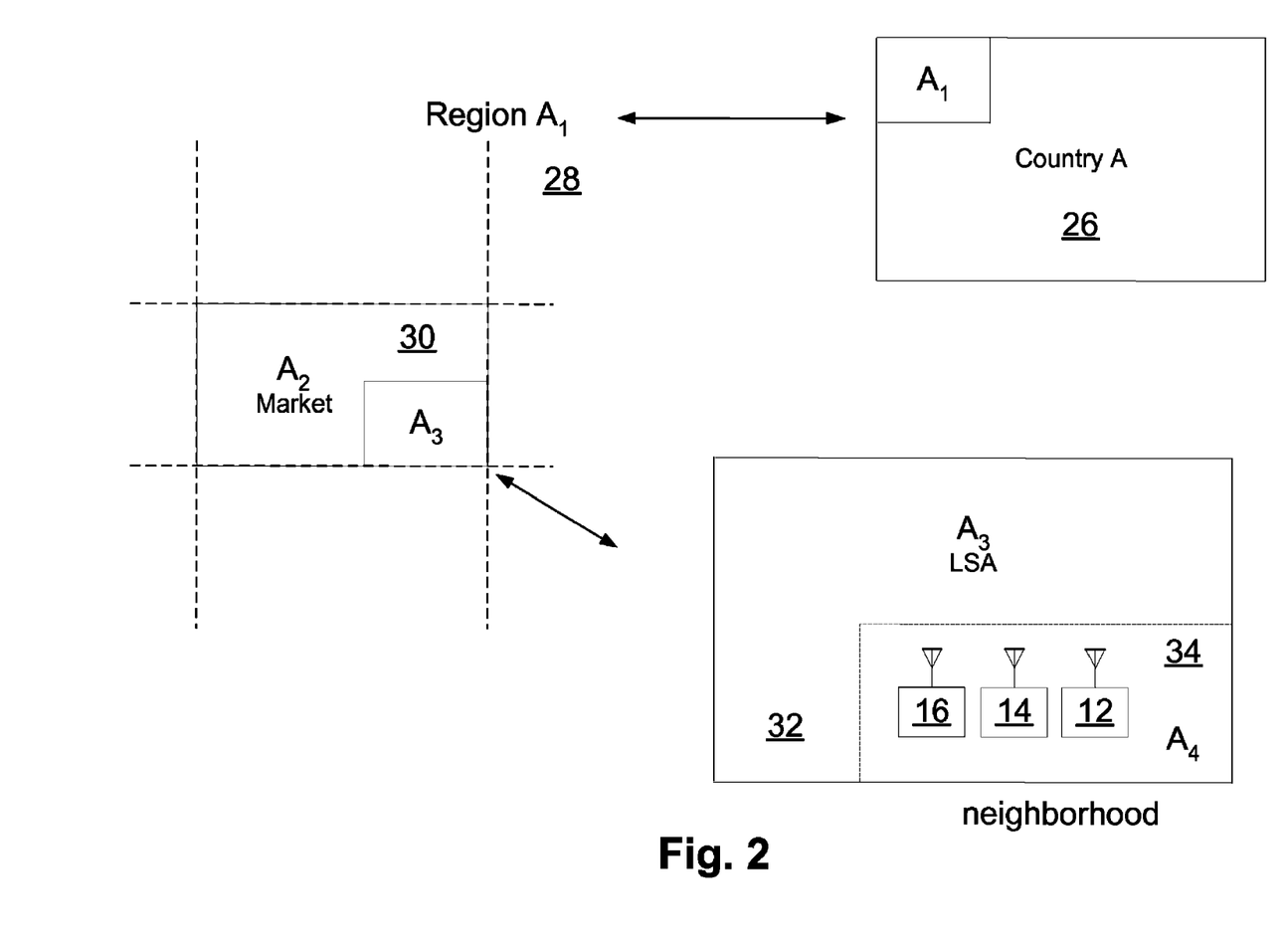
FIG. 2 illustrates a hierarchy of geographical areas around which the NEs are organized and monitored.

FIG. 2 illustrates a hierarchy of geographical areas around which the NEs are organized and monitored. A country "A" (26) or other large area, such as the continental United States, is composed of a number of regions, such as region A1 (28). Region A1 (28) may be a state, for example. Each region (28) includes a number of market areas, such as market A2 (30). A market area (30) might be a county in a state. Each market area (30) includes a plurality of LSAs (local sales areas), such as LSA A3 (32). An LSA 32 may be an area approximately the size of a small city. Inside each LSA 32 are a plurality of neighborhoods, such as neighborhood A4 (34). Typically, the sizing of the various areas in the geographical hierarchy is based upon the density of NEs and on geographic features.

Returning to FIG. 1, system 19 includes a display 40 having an input connected to application 20 to present a modifiable display of network elements, as represented in multiple levels in the hierarchy of geographical areas. That is, the display can view network elements at the lower hierarchical level, or be changed to view a summary of network elements on a map that includes a plurality of regional areas. A supervisor interface 42 connects to application 20, where the supervisor can be another machine-hosted programmable application or a human operator. Supervisor interface 42 is a keyboard, mouse, memory storage system, voice actuated system, application instruction set, or the like. The supervisor interface 42 commands modifications to application 20 in response to display 40.

Network elements configured as base stations and remote units have an operation and a non-operation status that is monitored by the system supervisor. The database 18 is updated on the status of each of the base station and remote units 12, 14, and 16. In some aspects of the invention, the updates are performed through supervisor interface 42, or the like. The application 20 summarizes the status of base stations and remote units 12, 14, and 16 at higher hierarchical levels of the system, and display 40 presents application 20 summaries. That is, the representation of the NEs 12, 14, and 16 at the neighborhood level 34 is summarized for representation at LSA level 32. Likewise, the condition or status of the LSAs, including the summaries of lower hierarchy neighborhoods, such as neighborhood 34, is summarized at the market level 30. Markets levels, such as market level 30, are summarized at the regional level.

The network management system 19 is designed with an effective graphical user interface (GUI) which presents the operators with a good overview of the entire system, while permitting the operator to pinpoint the individual network elements. Network 10 defines several network hierarchies based on the geographic locations. As mentioned above, the country is partitioned into several regions, and each region is partitioned into smaller market areas. The markets are partitioned into even smaller local service areas, and each local service area contains a group of NEs, which are the base stations and remote units. Each of these layers has a set of alarm status attributes which can be set dynamically in response to the network element status. The alarm status is graphically presented to the user as different colors for the NEs, or as network polygons. The illustrative network 10 presents several network "views" in multiple windows with different zoom levels. When an alarm comes in, network 10 can flag the corresponding polygons in the display depending on which zoom level the user is looking at. The operator can switch between zoom levels with a simple mouse click.

Figure 3A:
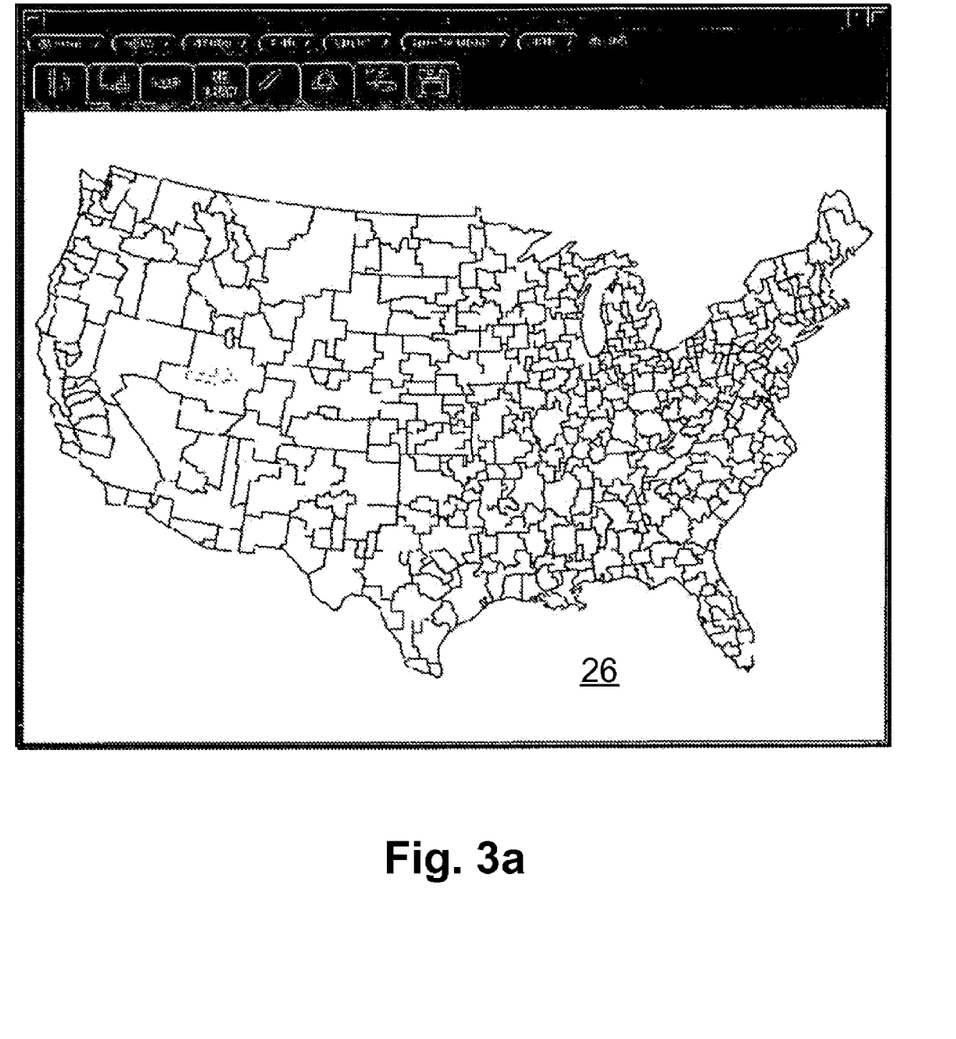
FIGS. 3a through 3e illustrate exemplary display windows used in the monitoring and evaluation of communication network problems.
Figure 3B:
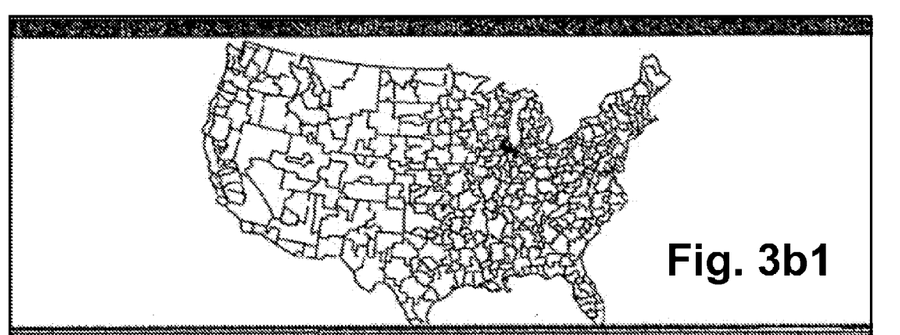
Figure 3B:
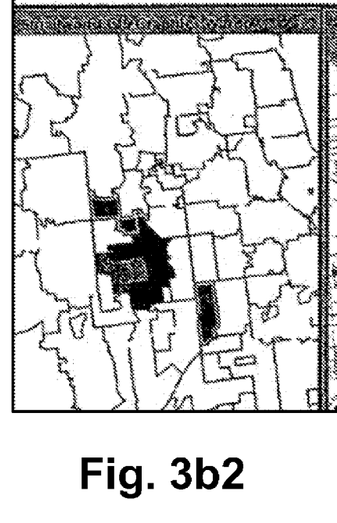
Figure 3B:
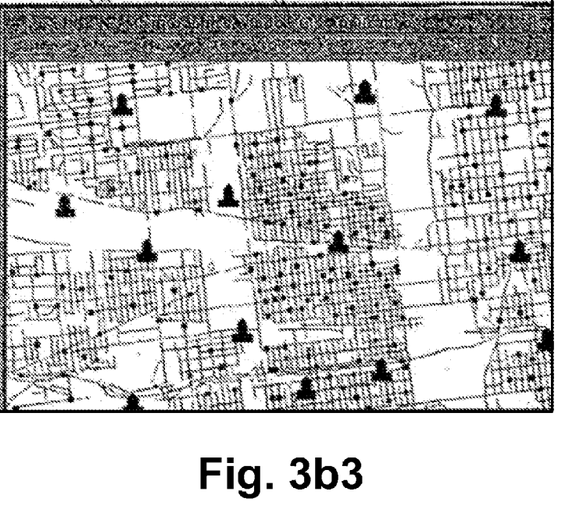

FIGS. 3a through 3e illustrate exemplary display windows used in the monitoring and evaluation of communication network problems. In FIG. 3a, operators at the Network Operations Center monitor the nation wide network status using the regional level display. As depicted in FIG. 3b1, a critical event is occurring as shown by the darkening of a region. Typically, the critical region displays a red icon in the troubled region, or the region coloring changes to red. The operator responsible for the region in which the critical event is occurring can zoom into the market level of the region (FIG. 3b2) and notice events happening in several adjoining markets with different levels of severity. The level of severity corresponds to the color in which the market is displayed in some aspects of the invention. In FIG. 3b3, the operator has zoomed to a particular market. The operator activities are prioritized based on the severity of the alarm.

Figure 3C:
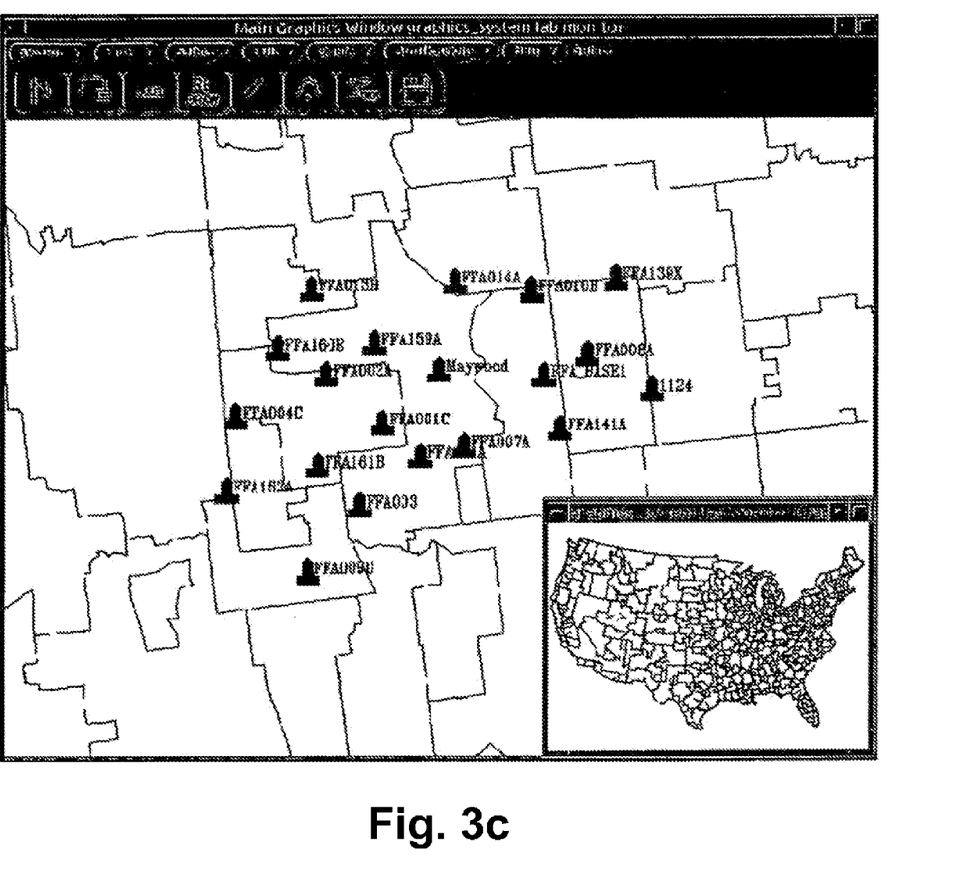
Figure 3D:
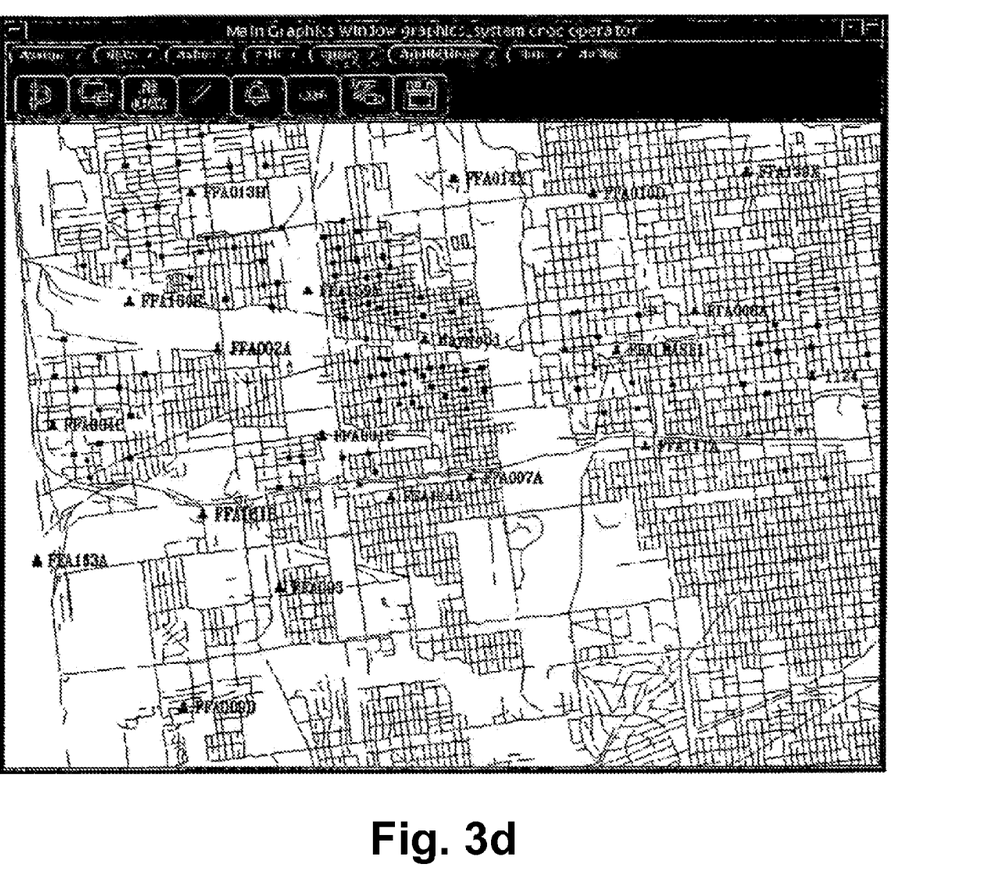
Figure 3E:
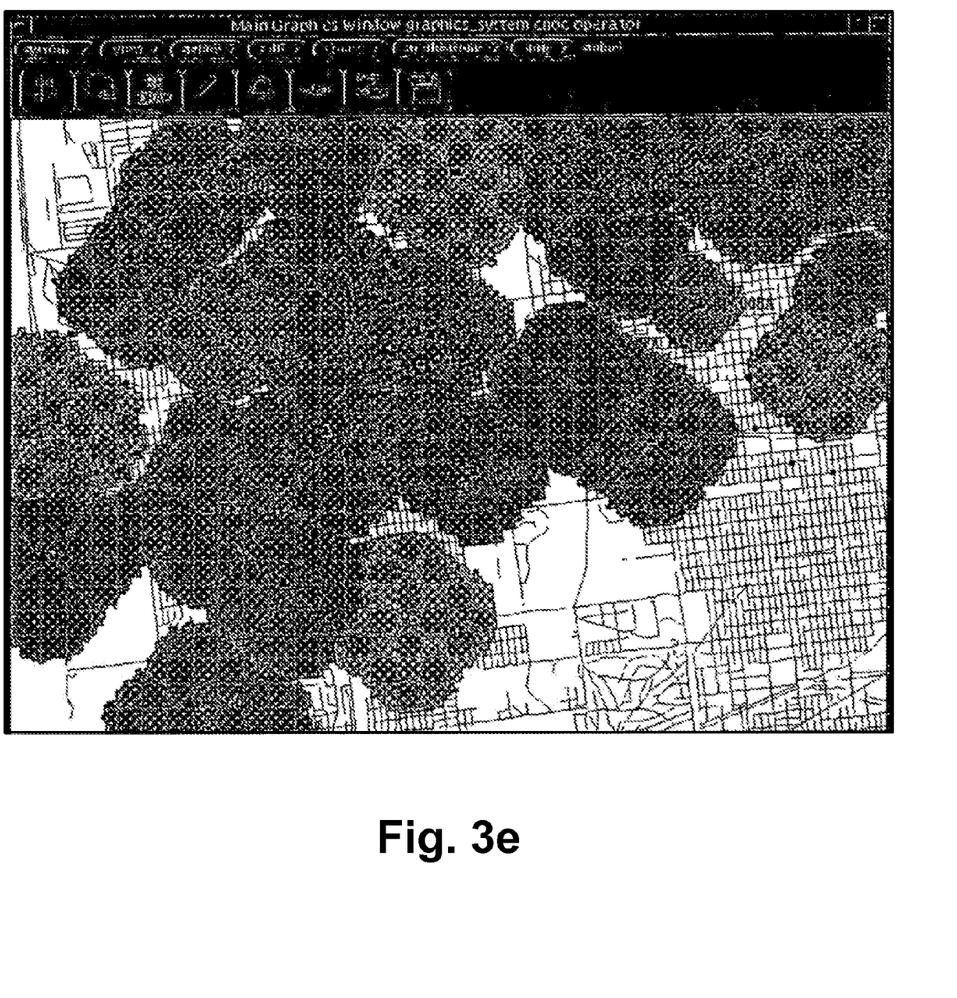

In FIG. 3c the operator is zooming into a local service area to determine which base stations are transmitting alarm conditions. In FIG. 3d, the remote units serviced by the base stations are presented to determine their alarm status. As shown in FIG. 3e, the radio frequency (RF) coverage of the base stations of FIG. 3c can be presented to further analyze the problem. Using the geographical scoping capabilities of the present invention network analysis tool, problems at low levels in the system can be summarized for presentation at the top level, and from the top level, the problems can be simply isolated and dealt with.

Figure 4:
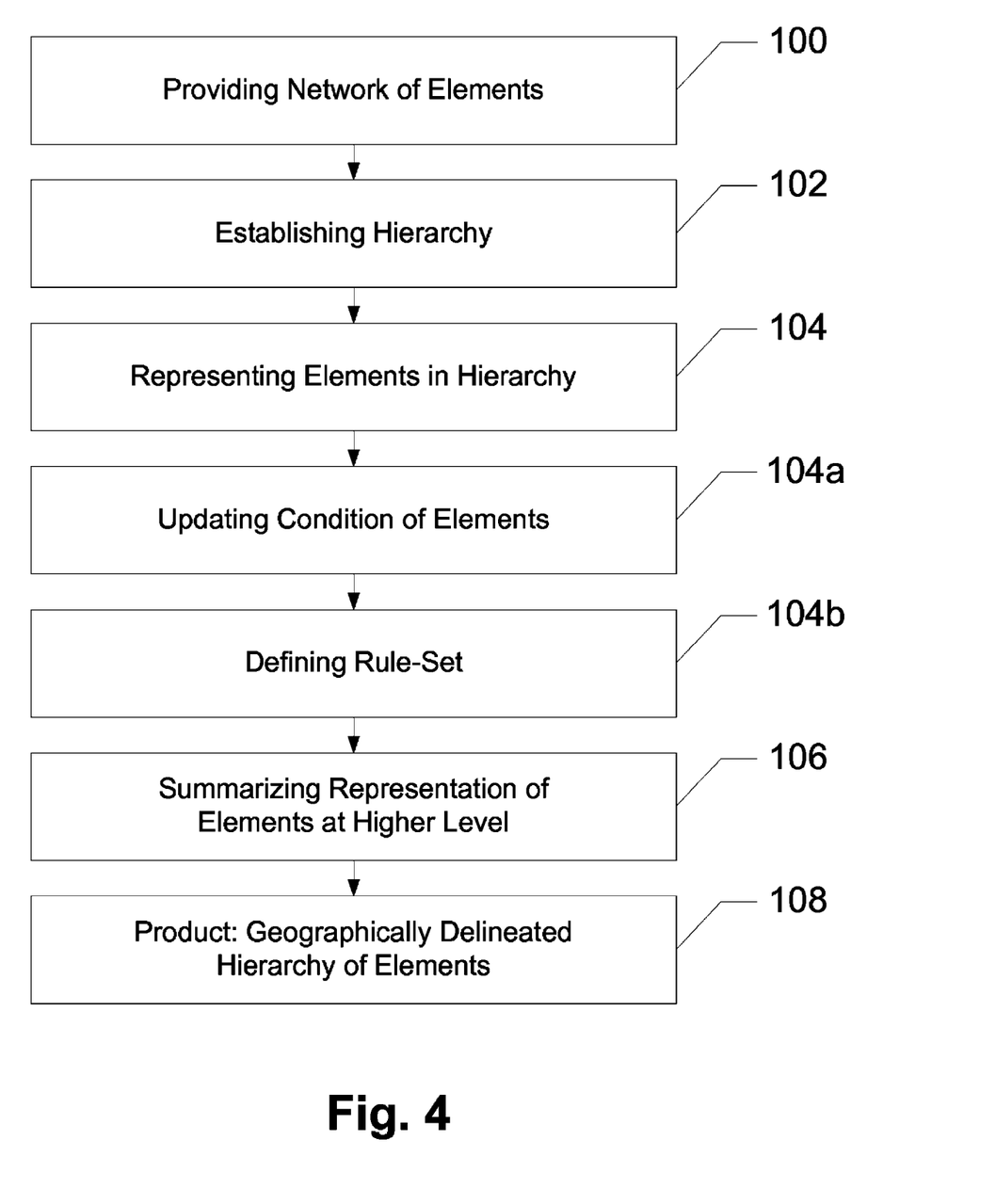
FIG. 4 is a flowchart illustrating the present inventive method for managing a communications network.

FIG. 4 is a flowchart illustrating the present inventive method for managing a communications network. Although the process is depicted as a series of numbered steps for clarity, no order in the process should be inferred unless explicitly stated. Step 100 provides network elements. Step 102 establishes a hierarchy of geographical areas in the communication network, where an area at a higher level of the hierarchy includes a plurality of areas at a lower level of the hierarchy. Step 104 represents each network element in geographical areas at a first level in the hierarchy. Step 104 includes representing a network element as a first icon, or polygon, on a map of geographical areas on the first level. Step 106 summarizes the representation of network elements at a second level in the geographical hierarchy, higher than the first level of the geographical hierarchy. Step 108 is a product where a network is geographically delineated to hierarchically represent the condition of elements in the network.

In some aspects of the invention, step 100 provides that the network is a fixed wireless service (FWS), including base stations and remote units. Then, the representation of network elements in first level geographical areas of step 104 includes representing the geographical positions of network base stations and remote units.

Step 102 includes establishing a hierarchy of n levels of geographical areas in the network, where each nth level geographical area includes a plurality of $(n-1)^{th}$ level geographical areas, and the summarization of network elements at a higher geographical level of Step 106 includes summarizing the representation of network elements at (n−1) levels of geographical areas.

Typically, the present inventive process of managing network elements includes monitoring the condition or status of the network elements. Then, the representation of network elements at the lower level in step 104 includes representing the condition of network elements; and the summarization of network elements at the higher level in step 106 includes setting an alarm at the second hierarchical level in response to the condition of a network element represented at the first level. For example, if remote unit 12 (see FIG. 2) loses power, this status will be summarized at LSA level 32, along with the status of other network elements located in neighborhood 34.

In some aspects of the invention, the network is managed in real-time, and a further step follows the representation of network elements at the lower level in step 104. Step 104a updates the condition of network elements represented in the first level of the geographical hierarchy of areas. Then, the summarization of network elements at the higher level in step 106 includes setting an alarm at the second hierarchical level in response to changes in the condition of a network element.

Typically, the representation of network elements at a lower level in step 104 includes representing the condition of a network element with a first icon that varies with respect to the status of the network element—for example, whether the element is operational or not. The summarization of network elements at the higher level in step 106 includes representing the status of a plurality of network elements as a second icon on a map of geographical areas on the second hierarchical level.

A further step precedes the summarization of network elements at the higher level in Step 106. Step 104b establishes a set of rules defining the representation of the second icon— that is, the conditions under which the second icon will be displayed. In some aspects of the invention, Step 106 includes the second icon being the coloration of a geographical area.

Further, Step 106 includes summarizing the status of a plurality of network elements with textual annotation. For example, the second icon may be the coloration of a geographical area, and the text may list the identification number of a network element. A green color may represent less than 5 non-operational elements, yellow may represent 5 to 10 non-operational elements, and red more than 10 non-operational elements.

One feature of the invention is the ability to use artificial intelligence to manage the alarms. In the communication network geographical hierarchy mentioned above, each high level network polygon (geographical area) contains multiple NEs. Multiple NE alarms must be mapped into a parent polygon at a higher level of hierarchy in such a way as be useful. To accomplish this, a rule-based artificial intelligent module in network 10 permits the operator to specify the mapping rules for NEs and other network hierarchies. For example, an operator can specify how many "Critical" alarms should happen within a group before the parent network polygon should be set as "Critical" alarming status. Alternately, the operator can specify a key NE to be monitored, instead of a group of NEs. This rule base provides operators with a flexibility to customize their monitoring focus wherever and whenever they want.

Typically, in step 100 the method of the invention provides for the installation of network elements into the communication network. Then, the representation of network elements at the lower level in step 104 includes entering the latitude and a longitude of a network element upon installation into the communication network. That is, the specific location of the elements is added to the lower level geographical map of elements. Step 100 also provides supervision of the communication network management process. Further steps (not shown) create supervisor identities. Then, the establishment of rule-sets in step 104b includes establishing a set of rules for each supervisor identity. This method permits each operator or application to customize and define a rule-set for the conditions, or for a specific region assigned to that supervisor.

The establishment of rule-sets in step 104b defines a set of rules responsive to conditions which include power source status, software corruption, hardware failure, environmental factors, and intrusion into the elements. As is well known in the art, there are many operational and performance features that can be monitored. Intrusion can be the detection of a presence at a base station, or the triggering of a switch in the opening of a control panel associated with the base station or remote unit.

Figure 5:
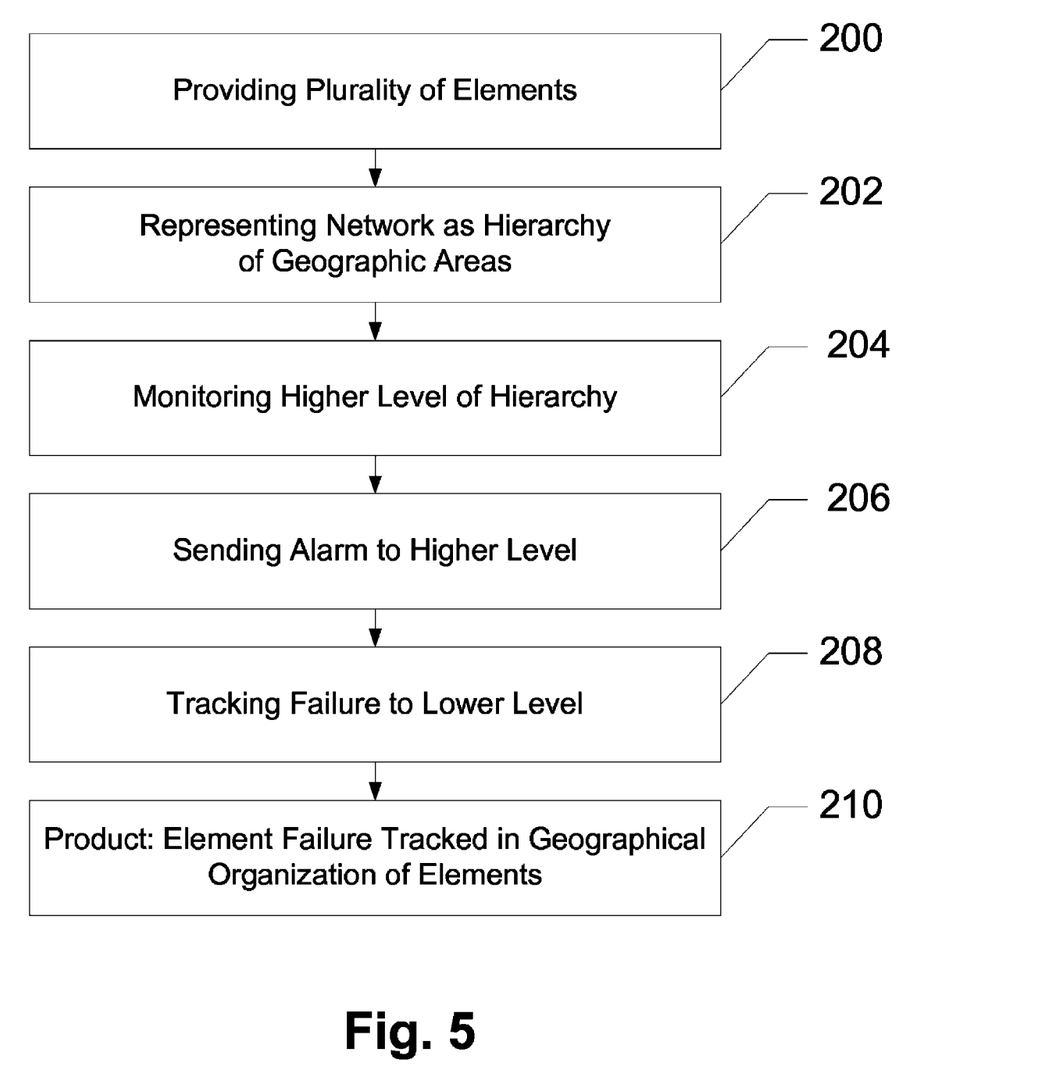
FIG. 5 is a flowchart depicting a present inventive method for determining failures in a communications network.

FIG. 5 is a flowchart depicting a method for determining failures in a communication network according to the present invention. As above, the steps are numbered for convenience and do not imply order, unless explicitly stated. Step 200 provides a plurality of network elements in the communications network. Step 202 represents the communications network as a hierarchy of geographical areas, where an area at a higher level of the hierarchy of geographical areas includes a plurality of areas at a lower level of the hierarchy of geographical areas. Typically, step 202 includes representing the network as a hierarchical arrangement of geographical maps, where a map at a higher level of the hierarchy of geographical areas includes a plurality of maps from a lower level of the hierarchy of geographical areas. Step 204 detects the failure of network elements. Step 206 sends an alarm to the higher level in the geographical hierarchy summarizing the failure of the network elements. Step 208, in response to the alarm, identifies and locates failed network elements at a lower level in the geographical hierarchy, working from the higher level summary. Step 210 is a product, where network element failure is tracked through a geographical organization of elements.

In one aspect of the invention, the sending of an alarm to a higher level in step 206 includes defining an alarm trigger that is responsive to network element failures.

Figure 6:
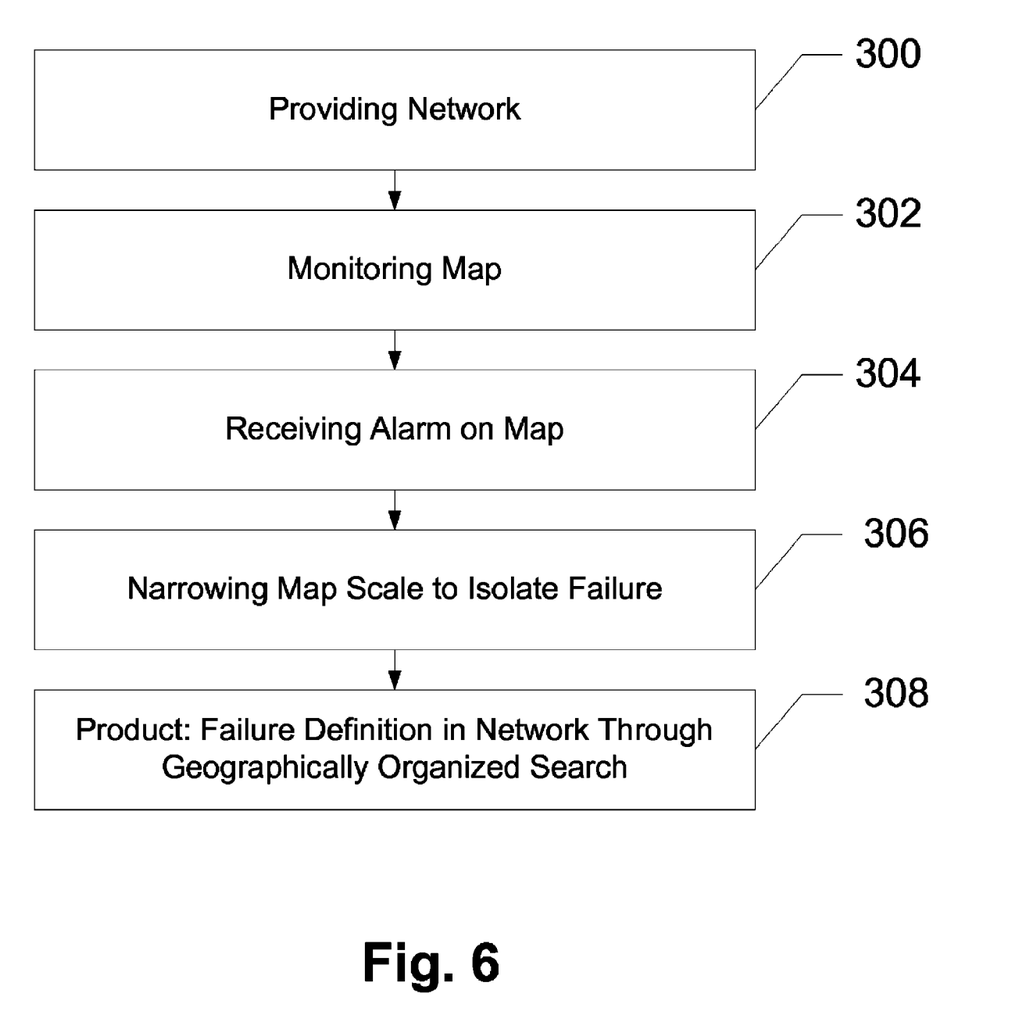
FIG. 6 is a flowchart depicting a method for determining the failure of network elements.

FIG. 6 is a flowchart depicting a method for determining the failure of network elements. Step 300 provides a communications network to which the network elements subscribe. Step 302 monitors a geographical map display summarizing the status of a plurality of network elements in the communication network. Step 304, on the map display, receives an alarm representing the failure of network elements. Step 306, in response to an alarm, narrows the scale of the map to geographically locate failed network elements. Step 308 is a product, where network element failures are defined through a geographically organized search.

A system and method has been provided for the intuitive management of large communication networks of network elements diffused across large geographical areas. The system and method permit the system operator to identify systems problems while monitoring the top level. The organization of network displays permits the operator to zoom down, from the higher levels of network abstraction, to identify the specific problems associated with individual elements in the system. Other embodiments and variations of the present invention will inevitably occur to those who are skilled in the art.

What is claimed is:

1. A system for presenting a communications network comprising:
   a plurality of network elements;
   a database in communication with the plurality of network elements, the database
      including a geographical location of each network element;
   an application coupled to said database for
      arranging a plurality of geographic areas in a hierarchy, each network element located at a lower level in the hierarchy,
      summarizing the network elements of each geographic area at a higher level in the hierarchy;
   a display coupled to the application to present a modifiable display of network elements as represented in multiple levels in the hierarchy; and
   a supervisor interface coupled to the application, the supervisor interface providing commands to said application to modify the display;
   wherein the communication network is a fixed wireless system, and in which the network elements are base stations and remote units.

2. The system of claim 1, wherein the hierarchy includes n levels of geographical areas in the network, each nth level includes a plurality of (n−1)th level geographical areas.

3. The system of claim 2, wherein the application summarizes the representation of network elements at (n−1) levels of geographical areas.

4. The system of claim 1, wherein the display represents the condition of network elements.

5. The system of claim 4, wherein the application updates the condition of network elements in the database.

6. The system of claim 5, wherein the application sets an alarm in response to changes in the condition of network elements.

7. The system of claim 4, wherein the application triggers an alarm at a second level in response to the condition of one of the network elements at a first level.

8. The system of claim 1, wherein the application summarizes the network elements at the higher level with one of an icon, a coloration of the geographic area, and a textual annotation.

9. A system for presenting a communications network comprising:
- a database including a geographical location of each network element in a plurality of network elements;
- an application coupled to said database for representing the communications network using a hierarchical arrangement of geographic areas, each network element located at a lower level in the hierarchy of geographical areas, a summary of the plurality of network elements of each geographic area at a higher level in the hierarchy of geographical areas;
- a display connected to the application to present network elements represented in multiple levels in the hierarchy of geographical areas; and
- a supervisor interface connected to the application, the supervisor interface providing commands to said application to modify the display;
- wherein the communication network is a fixed wireless system, and the network elements are base stations and remote units.

10. The system of claim 9, wherein modifying the display includes zooming in and out of levels of the hierarchy.

11. The system of claim 9, wherein the application monitors the condition of network elements.

12. The system of claim 11, wherein the display represents the condition of network elements.

13. The system of claim 12, wherein the application updates the condition of each base station and remote unit in the database.

14. The system of claim 11, wherein the application triggers an alarm at a second level in response to the condition of one of the network elements at a first level.

15. The system of claim 9, wherein the application summarizes the network elements at the higher level with one of an icon, a coloration of the geographic area, and a textual annotation.

16. A method of managing network elements in a communications network comprising:
- storing a geographical location of each network element in a plurality of network elements in a database;
- representing the geographical position of each network element in a geographical area at a first level in the geographical hierarchy on a graphical user interface;
- summarizing the representation of the network elements within a geographical area at a second level in the geographical hierarchy, the second level having a plurality of geographical areas represented on the graphical user interface;
- wherein the communications network includes a fixed wireless service and the plurality of network elements include base stations and remote units.

17. The method of claim 16, wherein the representing includes representing the condition of each base station and remote unit.

18. The method of claim 17, further comprising updating the condition of network elements in the database.

19. The method of claim 16, further comprising setting an alarm in response to changes in the condition of network elements.

20. The method of claim 16, wherein the summarizing includes summarizing the network elements at a higher level with one of an icon, a coloration of the geographic area, and a textual annotation.

* * * * *